United States Patent [19]

Funahashi

[11] Patent Number: 4,977,504
[45] Date of Patent: Dec. 11, 1990

[54] METHOD FOR DETERMINING DESIRED IMAGE SIGNAL RANGES AND METHOD FOR DETERMINING IMAGE REGIONS

[75] Inventor: Takeshi Funahashi, Kanagawa, Japan

[73] Assignee: Fuji Photo Film Co., Ltd., Kanagawa, Japan

[21] Appl. No.: 409,199

[22] Filed: Sep. 19, 1989

[30] Foreign Application Priority Data

Sep. 19, 1988 [JP] Japan .................. 63-233985
Sep. 19, 1988 [JP] Japan .................. 63-233986

[51] Int. Cl.$^5$ .................................. G01N 23/04
[52] U.S. Cl. ..................... 364/413.13; 250/327.2; 250/484.1; 382/6; 382/22
[58] Field of Search ............ 364/413.22, 413.13, 364/413.26; 250/484.1 B, 327.2 G; 378/20, 165; 382/6, 22, 25, 18, 27, 43, 51, 53

[56] References Cited

U.S. PATENT DOCUMENTS

| 4,258,264 | 3/1981 | Kotera et al. ............ 250/484 |
| 4,527,060 | 7/1985 | Suzuki et al. ............ 250/327.2 |
| 4,804,841 | 2/1989 | Nakajima et al. ......... 250/484.1 B |
| 4,804,842 | 2/1989 | Nakajima ................ 250/327.2 G |
| 4,806,756 | 2/1989 | Nakajima ................ 250/484.1 B |
| 4,806,759 | 2/1989 | Funahashi .............. 250/327.2 G |

FOREIGN PATENT DOCUMENTS

| 56-11395 | 2/1981 | Japan . |
| 039842 | 2/1987 | Japan ............ 250/327.2 G |

Primary Examiner—Jerry Smith
Assistant Examiner—Steven Kibby
Attorney, Agent, or Firm—Sughrue, Mion, Zinn, Macpeak & Seas

[57] ABSTRACT

A method of determining a desired image signal range comprises the steps of carrying out differentiation processing on image signal components to positions located along each of a plurality of lines on a recording medium having a radiation image recorded thereon, which lines include lines extending across an image part corresponding to a radiation blocking material. Absolute values are found from the values resulting from the differential processing of the image signal components, which absolute values exceed a threshold value. The area of the recording medium is divided into a plurality of small blocks, and processing of the image signal is conducted on the basis of the small blocks.

14 Claims, 10 Drawing Sheets

F I G .15
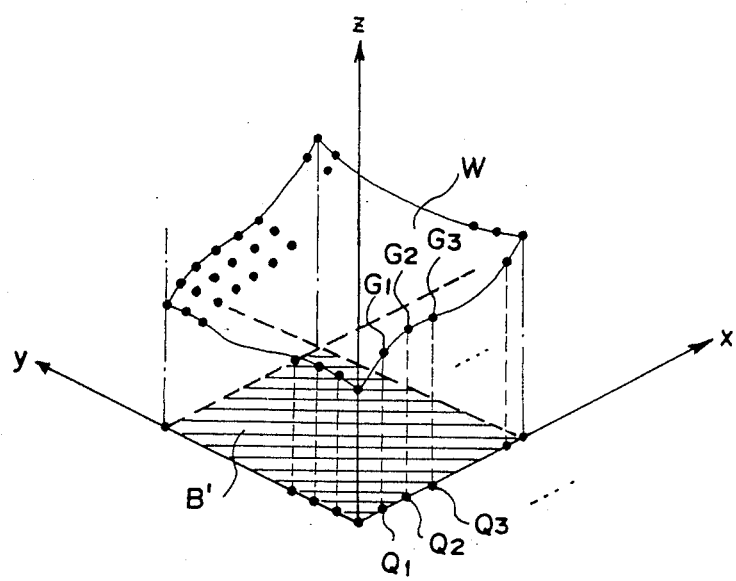

METHOD FOR DETERMINING DESIRED IMAGE SIGNAL RANGES AND METHOD FOR DETERMINING IMAGE REGIONS

BACKGROUND OF THE INVENTION

1. Field of the Invention

This invention relates to a method for determining a desired image signal range representing only a desired part of a radiation image outside of an image part, such as an image part corresponding to a region injected with contrast media, which image part is different from an object image which it is necessary to view, from an image signal detected from a recording medium having the radiation image recorded thereon. This invention also relates to a method for determining a desired image region on a recording medium having a radiation image recorded thereon, which image region carries only a desired image outside of an image part, such as an image part corresponding to a region injected with contrast media, which image part is different from an object image which it is necessary to view.

2. Description of the Prior Art

When certain kinds of phosphors are exposed to radiation such as X-rays, $\alpha$-rays, $\beta$-rays, $\gamma$-rays, cathode rays, or ultraviolet rays, they store part of the energy of the radiation. Then, when the phosphor which has been exposed to the radiation is exposed to stimulating rays such as visible light, light is emitted by the phosphor in proportion to the amount of energy stored during exposure to the radiation. A phosphor exhibiting such properties is referred to as a stimulable phosphor.

As disclosed in U.S. Pat. No. 4,258,264 and Japanese Unexamined Pat. Publication No. 56(1981)-11395, it has been proposed to use stimulable phosphors in radiation image recording and reproducing systems. Specifically, a sheet provided with a layer of the stimulable phosphor (hereinafter referred to as a stimulable phosphor sheet) is first exposed to radiation which has passed through an object such as the human body in order to store a radiation image of the object thereon, and is then scanned with stimulating rays, such as a laser beam, which cause it to emit light in proportion to the amount of energy stored during exposure to the radiation. The light emitted by the stimulable phosphor sheet upon stimulation thereof is photoelectrically detected and converted into an electric image signal, and the image signal is used to reproduce the radiation image of the object as a visible image on a recording material such as photographic film, a display device such as a cathode ray tube (CRT), or the like.

In the aforesaid radiation image recording and reproducing systems, in order to eliminate various problems caused by variations in the input information and/or to obtain a radiation image having a good image quality which can serve as an effective tool in, for example, the efficient and accurate diagnosis of an illness, it is desirable to ascertain the characteristics of the image input information before the radiation image is reproduced as a visible image so that the read-out gain can be adjusted to an appropriate value. The characteristics of the image input information depend on the conditions under which an image is recorded, such as the level of the radiation dose used when the image was recorded, on the image input pattern which is determined by what portion of an object (e.g. the chest or the abdomen of a human body) is recorded, and on the image recording method used, such as plain image recording or contrasted image recording. Determining the characteristics of the image input information will hereinafter simply be referred to as "ascertaining the image input information." It is also desirable to adjust the scale factor in accordance with the contrast in the image input pattern in order to optimize the resolution of the reproduced visible image.

The method as disclosed in U.S. Pat. No. 4,527,060 may be used to ascertain the image input information before the visible image is reproduced. In the disclosed method, a preliminary read-out operation (hereinafter referred to as "preliminary readout") is carried out to ascertain the image input information of a radiation image stored on a stimulable phosphor sheet. During the preliminary readout, stimulating rays are used which have an energy level lower than the energy level of the stimulating rays used in a final read-out operation (hereinafter referred to as "final readout"), which obtains a visible image which can be viewed and used, particularly for diagnostic purposes. After the preliminary readout is completed, the final readout is carried out. In the final readout, the read-out gain and/or the scale factor is adjusted to an appropriate value, and/or appropriate signal processing of the image signal is conducted, on the basis of the image input information obtained during the preliminary readout.

Various methods may be used for approximately ascertaining the image input information of the image stored on the stimulable phosphor sheet from a preliminary read-out image signal obtained during the aforesaid preliminary readout. One method is to utilize a histogram (or a probability density function) of the preliminary read-out image signal. Specifically, the image input information can be ascertained from, for example, a characteristic value such as the maximum signal value, the minimum signal value, or a signal value which occurs most frequently, i.e. the signal value corresponding to the maximum value of the histogram. Therefore, when the read-out conditions such as the read-out gain and the scale factor and/or the image processing conditions are adjusted on the basis of the histogram, it is possible to reproduce a visible radiation image having an improved image quality, which makes the image a particularly effective tool in, for example, the accurate and efficient diagnosis of an illness.

On the other hand, in the course of radiation image recording, it is often desirable for portions of the object not related to a diagnosis or the like to be prevented from being exposed to radiation. Therefore, in many cases, when a radiation image is recorded, a radiation blocking plate made of lead or the like is placed at part of the object. Also, an organ of a human body is often injected with contrast media, such as barium, which have a high radiation absorptivity so that an image of an object portion which it is necessary to view is recorded clearly. The contrast media (specifically, negative contrast media) and the radiation blocking plate are different in their effects, but have high radiation absorptivities. Therefore, the image parts corresponding to the contrast media and the radiation blocking plate have markedly low densities in the reproduced radiation images.

Therefore, in cases where an image of contrast media or a radiation blocking plate has been recorded together with a radiation image of an object on a stimulable phosphor sheet, the image input information of the radiation image stored on the stimulable phosphor sheet is ascertained incorrectly. (A material having a high radiation absorptivity, such as contrast media or a radiation blocking plate is hereinafter referred to as a radiation blocking material.) Specifically, in the aforesaid cases, since components of the image signal representing the image part corresponding to the radiation blocking material are also included in a histogram of the image signal, the signal components having small values (low image density) occur comparatively frequently. Therefore, the image input information is ascertained as if the object image which it is necessary to view had a low image density as a whole.

In order to eliminate the aforesaid problems, a method has heretofore been used wherein a range of image signal components on a low image density side which components represent an image part corresponding to a radiation blocking material is eliminated from a histogram of a preliminary read-out image signal and image input information is ascertained from the remainder of the histogram. However, the range over which the image signal components representing the image part corresponding to a radiation blocking material are distributed varies in accordance with, for example, what portion of an object is recorded and what image recording method is used. Therefore, with the conventional method, it is not always possible to ascertain accurately the range over which the image signal components representing the image part corresponding to a radiation blocking material are distributed (stated reversely, the range over which the image signal components representing a desired image part, which it is necessary to view and which is outside of the image part corresponding to the radiation blocking material, are distributed).

SUMMARY OF THE INVENTION

The primary object of the present invention is to provide a method for accurately determining a desired image signal range representing only a desired part of a radiation image, which it is necessary to view and which is outside of the image part corresponding to a radiation blocking material.

Another object of the present invention is to provide a method for accurately determining a desired image region on a recording medium having a radiation image recorded thereon, which image region carries only a desired image which it is necessary to view and which is outside of the image part corresponding to a radiation blocking material.

The present invention provides a first method for determining a desired image region on a recording medium having a radiation image of an object recorded thereon together with an image of a radiation blocking material, which image region substantially carries only a desired image part outside of the image part corresponding to the radiation blocking material,
the method for determining a desired image region comprising the steps of:
(i) carrying out an image read-out operation from said recording medium in order to obtain an image signal,
(ii) carrying out differentiation processing on image signal components of said image signal corresponding to positions located along each of a plurality of lines on said recording medium, which lines include lines extending across the image part corresponding to said radiation blocking material,
(iii) finding the absolute values among the values resulting from the carrying out of the differentiation processing on said image signal components, which absolute values exceed a predetermined threshold value,
(iv) dividing the area of said recording medium into a plurality of small blocks, and finding the degree of occurrence with which the points on said recording medium associated with the absolute values exceeding said threshold value occur in each of said small blocks, and
(v) determining a group of the small blocks, in which the degrees of occurrence of said points are not higher than a predetermined degree, as said desired image region.

The present invention further provides a second method for determining a desired image region on a recording medium having a radiation image of an object recorded thereon together with an image of a radiation blocking material, which image region substantially carries only a desired image part outside of the image part corresponding to the radiation blocking material,
the method for determining a desired image region comprising the steps of:
(i) carrying out an image read-out operation from said recording medium in order to obtain an image signal,
(ii) dividing the area of said recording medium into a plurality of small blocks, and carrying out orthogonal transformation of image signal components of said image signal corresponding to each of said small blocks in order to obtain transformed signal components,
(iii) finding a characteristic value, which represents the proportion with which super-high frequency components are present in the image information corresponding to the region inside of each said small block, from the transformed signal components, and
(iv) determining a group of the small blocks associated with the proportions, which are represented by the characteristic values and which are smaller than a predetermined value, as said desired image region.

The present invention still further provides a third method for determining a desired image region on a recording medium having a radiation image of an object recorded thereon together with an image of a radiation blocking material, which image region substantially carries only a desired image part outside of the image part corresponding to the radiation blocking material,
the method for determining a desired image region comprising the steps of:
(i) carrying out an image read-out operation from said recording medium in order to obtain an image signal,
(ii) setting a logical space having a plane corresponding to said recording medium, and setting coordinate points, which correspond to positions of picture elements located on said recording medium, in said plane,
(iii) expressing the values of said image signal at the positions of the picture elements corresponding to the respective coordinate points as the distances between points, which are spaced apart in a predetermined direction from the respective coordinate points, and the corresponding coordinate points, (iv) dividing said plane into small divisions corresponding to small blocks of said recording medium, and calculating the surface area of a plane in which all of said points spaced from the respective coordinate points in each said small division lie, and (v) calculating the ratio of said surface area to the area of each said small division, and determining a group of the small blocks of said recording medium corresponding to the small divisions associated with the ratios which are smaller than a predetermined value, as said desired image region.

In a radiation image, as described above, an image part corresponding to a radiation blocking material such as contrast media has an image density markedly lower than the image density at the other parts of the radiation image. Also, the image part corresponding to the radiation blocking material was exposed to radiation scattered by the object when the radiation image of the object was recorded. Therefore, the image part corresponding to the radiation blocking material is rough, and more noise components than in image signal components representing the other parts of the radiation image are included in the image signal components representing the image part corresponding to the radiation blocking material.

Therefore, in the first method for determining a desired image region in accordance with the present invention, the absolute values of the differentiated values obtained from differentiation processing are markedly large at the noise components. Also, in the image part corresponding to the radiation blocking material, many points associated with markedly large absolute values of the differentiated values occur. Accordingly, it can be regarded that the small blocks, in which the degrees of occurrence of the points associated with markedly large absolute values of the differentiated values are higher than a predetermined degree, are present in an image part corresponding to the radiation blocking material. To put in another way, it can be regarded that the small blocks, in which the degrees of occurrence of the points associated with markedly large absolute values of the differentiated values are not higher than a predetermined degree, are present in the desired image region. Therefore, a group of the small blocks, in which the degrees of occurrence of the points associated with markedly large absolute values of the differentiated values are not higher than a predetermined degree, is determined as the desired image region.

In the second method for determining a desired image region in accordance with the present invention, in cases where the image information corresponding to the region inside of a small block of the recording medium includes many noise components, the values of the transformed signal components, which are obtained from the orthogonal transformation of said image information and which correspond to the super-high frequency components of said image information, are larger than the values of the transformed signal components corresponding to a small block including few noise components. Therefore, the transformed signal components corresponding to a block located in the image part corresponding to the radiation blocking material represent a higher proportion, with which super-high frequency components are present in the image information, than the proportions which the transformed signal components corresponding to the other blocks, i.e. the blocks located in the desired image region. Accordingly, it can be regarded that the small blocks associated with the proportions, which are determined from the transformed signal components and which are not smaller than a predetermined value, are present in the image part corresponding to the radiation blocking material. Also, it can be regarded that the small blocks associated with the proportions smaller than the predetermined value, are present in the desired image region. Therefore, a group of the small blocks associated with the proportions smaller than the predetermined value is determined as the desired image region.

In the third method for determining a desired image region in accordance with the present invention, the coordinate points which correspond to positions of picture elements located on the recording medium are set in the plane of the logical space which plane corresponds to the recording medium. The values of the image signal at the positions of the picture elements corresponding to the respective coordinate points are expressed as the distances between the points, which are spaced apart in a predetermined direction from the respective coordinate points, and the corresponding coordinate points. The plane is divided into the small divisions corresponding to small blocks of the recording medium, and said points corresponding to the respective coordinate points located in each of the small divisions are considered. When the values of the image signal fluctuate sharply, the distances of said points from the corresponding coordinate points change sharply. As a result, the surface area of a plane in which all of said points spaced from the respective coordinate points in each small division lie becomes large. As described above, the image signal components representing the image part corresponding to the radiation blocking material include many noise components caused by scattered radiation, and the values of the image signal components fluctuate sharply. Therefore, it can be regarded that the small blocks of the recording medium corresponding to the small divisions associated with the ratios which are not smaller than a predetermined value are present in the image part corresponding to the radiation blocking material. Conversely, it can be regarded that the small blocks of the recording medium corresponding to the small divisions associated with the ratios which are smaller than a predetermined value are present in the desired image region. Therefore, a group of the small blocks of the recording medium corresponding to the small divisions associated with the ratios which are smaller than a predetermined value is determined as the desired image region.

With the first, second and third methods for determining a desired image region in accordance with the present invention, a desired image region outside of an image part which corresponds to a radiation blocking material and which includes much noise can be determined accurately. Therefore, in cases where the first, second and third methods for determining a desired image region in accordance with the present invention are utilized to adjust read-out conditions and/or image processing conditions, it becomes possible to set the read-out conditions and/or the image processing conditions suitable for the image input information excluding the information about the image part corresponding to the radiation blocking material, and to reproduce a visible image suitable for viewing purposes, particularly for diagnostic purposes.

BRIEF DESCRIPTION OF THE DRAWINGS

FIG. 15 is an explanatory view showing the third embodiment of the method for determining a desired image region in accordance with the present invention.

DESCRIPTION OF THE PREFERRED EMBODIMENTS

The present invention will hereinbelow be described in further detail with reference to the accompanying drawings.

Figure 1:
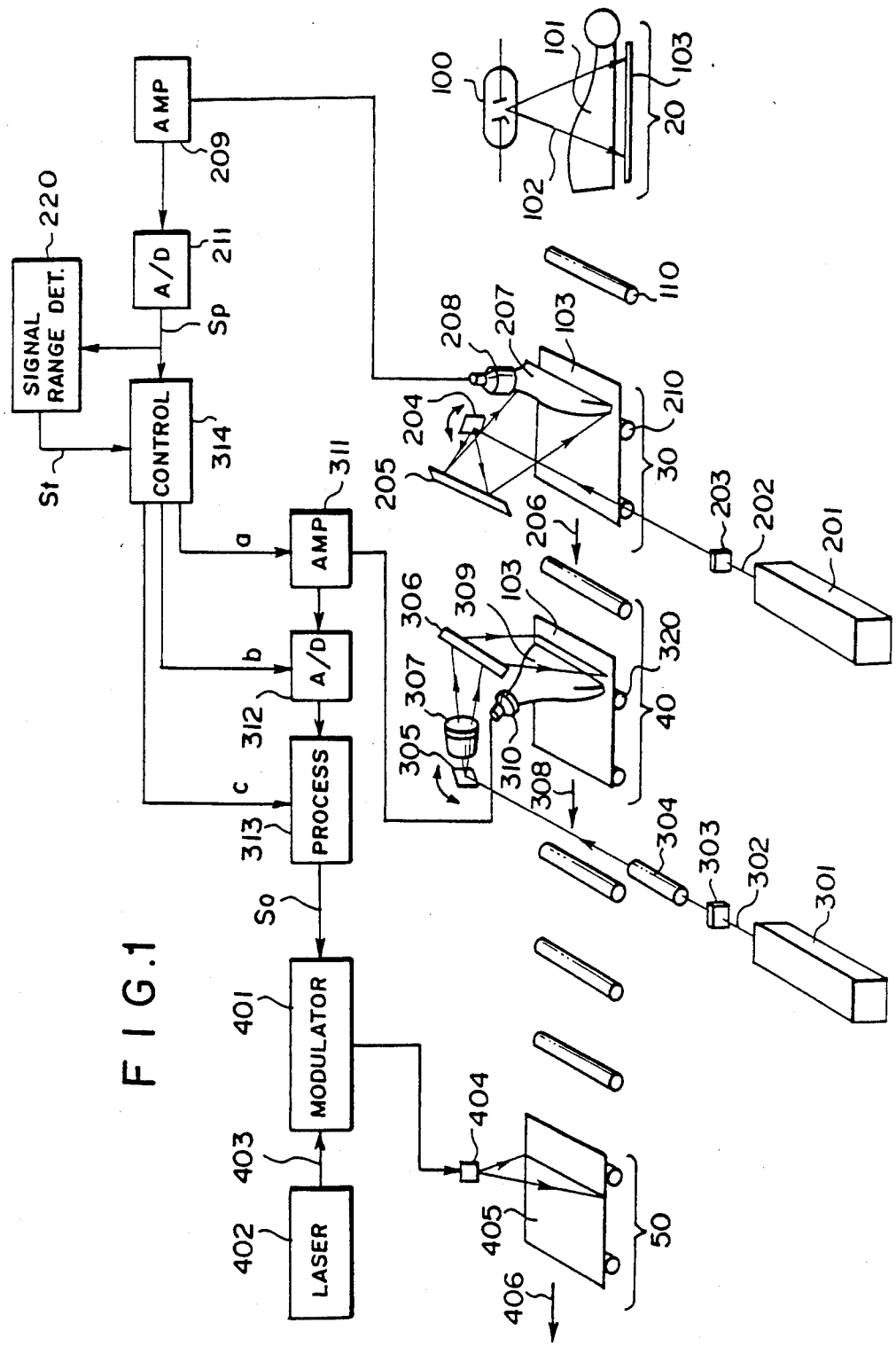
FIG. 1 is a schematic view showing a radiation image recording and reproducing system wherein an embodiment of the method for determining a desired image signal range in accordance with the present invention is employed.

With reference to FIG. 1, a radiation image recording and reproducing system wherein an embodiment of the method for determining a desired image signal range in accordance with the present invention is employed comprises basically a radiation image recording section 20, a preliminary read-out section 30, a final read-out section 40, and an image reproducing section 50. In the radiation image recording section 20, a radiation 102 is emitted toward an object 101 by a radiation source 100 constituted of an X-ray tube or the like. A stimulable phosphor sheet 103 for storing radiation energy thereon is placed at a position where it is exposed to the radiation 102 which has passed through the object 101, and a radiation image of the object 101 is stored on the stimulable phosphor sheet 103.

The stimulable phosphor sheet 103 carrying the radiation image of the object 101 stored thereon is sent to the preliminary read-out section 30 by a sheet conveyance means 110 constituted of a conveyor roller or the like. At the preliminary read-out section 30, a laser beam 202 produced by a laser beam source 201 first passes through a filter 203 which filters out light having wavelengths within the range of wavelengths of the light emitted by the stimulable phosphor sheet 103 upon stimulation thereof by the laser beam 202. Then, the laser beam 202 is one-dimensionally deflected by a light deflector 204 such as a galvanometer mirror and directed onto the stimulable phosphor sheet 103 by a plane reflection mirror 205. The laser beam source 201 is selected so that the laser beam 202 produced thereby has a wavelength distribution different from and far apart from the wavelength distribution of the light emitted by the stimulable phosphor sheet 103 when it is stimulated. While the laser beam 202 impinges upon the stimulable phosphor sheet 103, the stimulable phosphor sheet 103 is moved in the direction indicated by the arrow 206 (i.e. in the sub-scanning direction) by a sheet conveyance means 210 constituted of conveyor rollers or the like, and thus the overall surface of the stimulable phosphor sheet 103 is exposed to and scanned by the laser beam 202. The power of the laser beam source 201, the beam diameter of the laser beam 202, the speed with which the laser beam 202 scans, and the speed at which the stimulable phosphor sheet 103 moves are selected so that the level of the stimulation energy of the laser beam 202 used during the preliminary readout is lower than the level of the stimulation energy of the laser beam used during the final readout carried out in the final read-out section 40.

When it is exposed to the laser beam 202 as described above, the stimulable phosphor sheet 103 emits light in an amount proportional to the amount of energy stored thereon during exposure to the radiation, and the emitted light enters a light guide member 207 which may be of the shape and material disclosed in U.S. Pat. No. 4,346,295. The light is guided inside of the light guide member 207 through total reflection, emanates from a light output face of the light guide member 207 and is received by a photodetector 208 constituted of a photomultiplier or the like. The light receiving face of the photodetector 208 is positioned so that it is in close contact with a filter which transmits only light having wavelengths within the range of wavelengths of light emitted by the stimulable phosphor sheet 103 and filters out light having wavelengths within the range of wavelengths of the stimulating rays, so that the photodetector 208 detects only the light emitted by the stimulable phosphor sheet 103 upon stimulation thereof. The light detected by the photodetector 208 is converted into an electric signal carrying the image input information stored on the stimulable phosphor sheet 103, and amplified by an amplifier 209. The signal generated by the amplifier 209 is digitized by an A/D converter 211, and sent as a preliminary read-out image signal Sp to a final read-out control circuit 314 in the final read-out section 40. On the basis of the image input information which the preliminary read-out image signal Sp represents, the final read-out control circuit 314 calculates a read-out gain setting value (a), a scale factor setting value (b), and a reproduced image processing condition setting value (c). The preliminary read-out image signal Sp is also sent to an image signal range determining means 220 which will be described in detail later.

After the preliminary readout from the stimulable phosphor sheet 103 is finished, the stimulable phosphor sheet 103 is sent to the final read-out section 40. In this section, a laser beam 302 produced by a laser beam source 301 first passes through a filter 303 which filters out light having wavelengths within the range of the wavelengths of light emitted by the stimulable phosphor sheet 103 upon stimulation thereof by the laser beam 302. Then, the beam diameter of the laser beam 302 is precisely adjusted by a beam expander 304. The laser beam 302 is then deflected by a light deflector 305 formed of a galvanometer mirror or the like, and is made to impinge upon the stimulable phosphor sheet 103 by a plane reflection mirror 306. Between the light deflector 305 and the plane reflection mirror 306, an fθ lens 307 is disposed for keeping the beam diameter of the laser beam 302 uniform as it scans the stimulable phosphor sheet 103. While the laser beam 302 impinges upon the stimulable phosphor sheet 103, the stimulable phosphor sheet 103 is moved in the direction indicated by the arrow 308 (i.e. in the sub-scanning direction) by a sheet conveyance means 320 constituted of conveyor rollers or the like and, consequently, the overall area of the stimulable phosphor sheet 103 is exposed to and scanned by the laser beam 302. Upon exposure to the laser beam 302, the stimulable phosphor sheet 103 emits light in proportion to the amount of energy stored thereon during exposure to radiation, and the light emitted enters a light guide member 309 which is made of the same material and has the same configuration as the light guide member 207 used for the preliminary read-out. The light emitted by the stimulable phosphor sheet 103 is guided inside of the light guide member 309 through repeated total reflection, emanates from the light output face of the light guide member 309 and is received by a photodetector 310 constituted of a photomultiplier or the like. The light receiving face of the photodetector 310 is positioned in close contact with a filter which selectively transmits only the light having wavelengths within the range of wavelengths of light emitted by the stimulable phosphor sheet 103, so that the photodetector 310 detects only the light emitted thereby.

The output of the photodetector 310, which photoelectrically detects the light emission representing the radiation image stored on the stimulable phosphor sheet 103, is amplified to an appropriate level by an amplifier 311. The gain of the amplifier 311 is adjusted on the basis of the read-out gain setting value (a) calculated by the control circuit 314. The amplified electric signal is fed into an A/D converter 312 which converts the electric signal into a digital signal by use of a scale factor which is adjusted by the scale factor setting value (b) to suit the width in the fluctuation of the values of the signal. The digital signal thus obtained is fed into a signal processing circuit 313, in which it is subjected to signal processing (image processing), the nature of which signal processing is based on the reproduced image processing condition setting value (c). After the digital signal is processed, a visible radiation image is obtained which is suitable for viewing, particularly for diagnostic purposes.

The processed digital signal is output as a read-out image signal (a final read-out image signal) So. The final read-out image signal So generated by the signal processing circuit 313 is fed into a light modulator 401 in the image reproducing section 50. In the image reproducing section 50, a laser beam 403 produced by a reproducing laser beam source 402 is modulated by the light modulator 401 on the basis of the final read-out image signal So received from the signal processing circuit 313, and is made to impinge upon a photosensitive material 405 such as photographic film by a scanning mirror 404 which causes the laser beam 403 to scan the photosensitive material 405. At this time, the photosensitive material 405 is moved in a direction normal to the aforesaid scanning direction, i.e. in the direction indicated by the arrow 406. Accordingly, the radiation image represented by the final read-out image signal So is recorded on the photosensitive material 405. To reproduce the radiation image, it is possible to use any other appropriate method such as the aforesaid method using a CRT display device.

Figure 2:
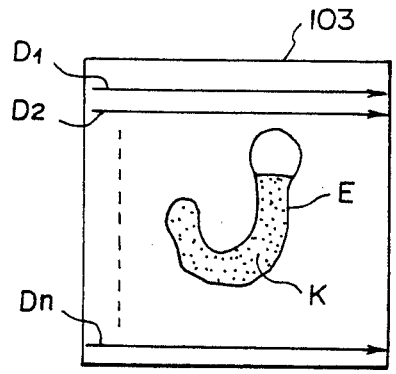
FIGS. 2 and 3 are explanatory views showing the states of radiation images stored on stimulable phosphor sheets.
Figure 3:
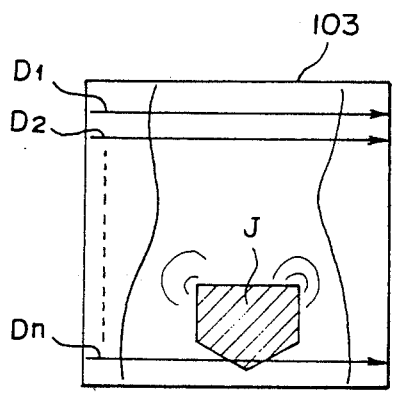

A radiation image of an organ injected with contrast media having a high radiation absorptivity is often recorded on the stimulable phosphor sheet 103. FIG. 2 shows an example of such a radiation image stored on the stimulable phosphor sheet 103. In FIG. 2, E denotes the image part corresponding to the walls of the stomach, and K denotes the image part corresponding to the region injected with contrast media. Also, a radiation blocking plate is often placed at part of the object 101 when the radiation image of the object 101 is recorded. FIG. 3 shows an example of such a radiation image stored on the stimulable phosphor sheet 103. In FIG. 3, J denotes the image part corresponding to the radiation blocking plate. The image part K corresponding to the region injected with contrast media and the image part J corresponding to the radiation blocking plate have image densities markedly lower than the density of the object image part related to a diagnosis.

Figure 5:
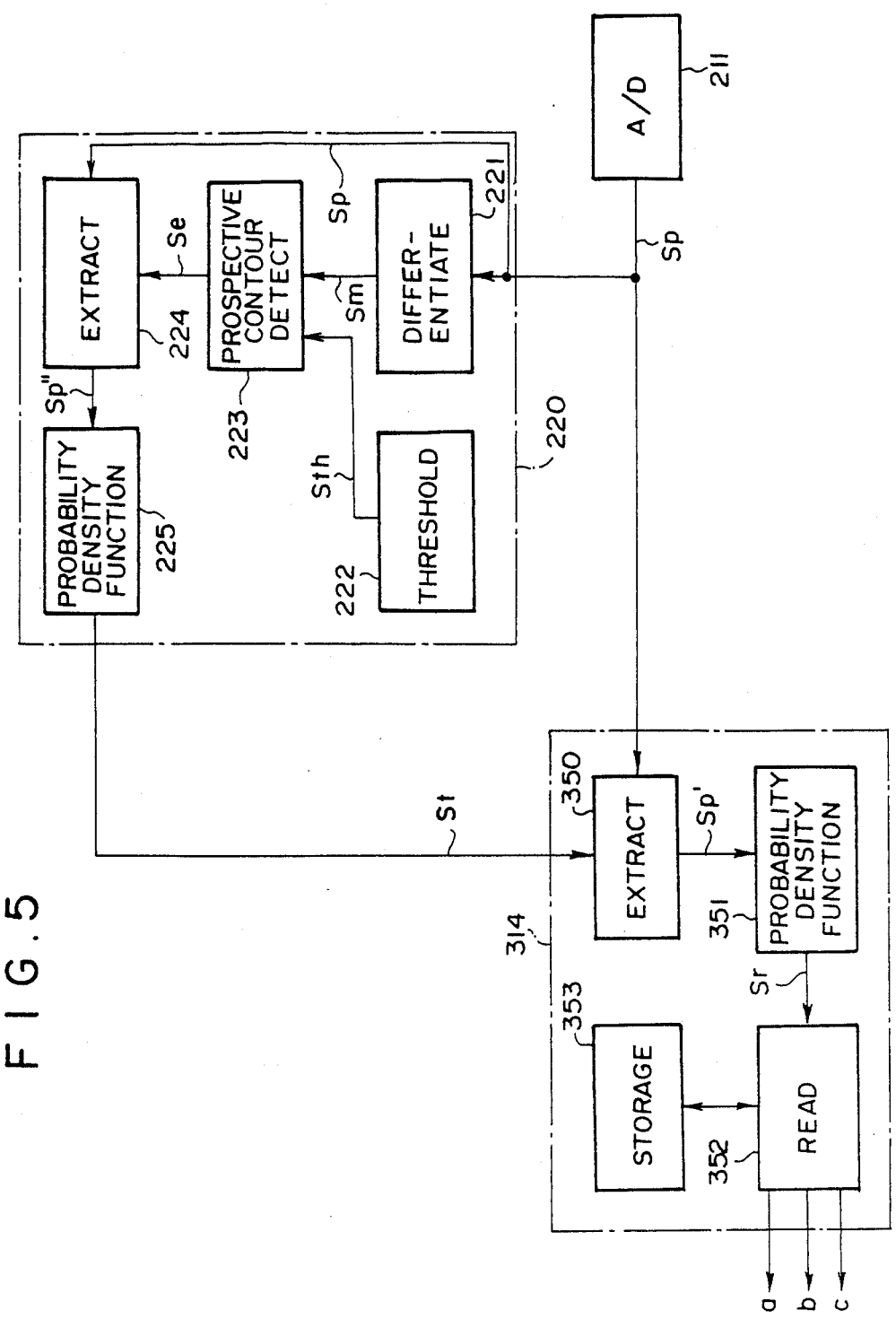
FIG. 5 is a block diagram showing part of the radiation image recording and reproducing system shown in FIG. 1.

A technique for accurately adjusting the read-out gain setting value (a), the scale factor setting value (b) and the image processing condition setting value (c) when the radiation image includes the image part K corresponding to the region injected with contrast media or the image part J corresponding to the radiation blocking plate will hereinbelow be described with reference to FIG. 5. As shown in FIG. 5, the control circuit 314 comprises a signal extracting section 350, a probability density function analyzing section 351, a read section 352, and a storage section 353. The aforesaid preliminary read-out image signal Sp is fed into the signal extracting section 350 which extracts a preliminary read-out image signal Sp' only within a specified region as will be described later. The preliminary read-out image signal Sp' is sent from the signal extracting section 350 to the probability density function analyzing section 351. The probability density function analyzing section 351 creates a probability density function of the preliminary read-out image signal Sp', calculates the maximum value of the signal, the minimum value of the signal, the signal value which occurs most frequently, i.e. the signal value corresponding to the maximum value of the probability density function, or the like, and feeds a signal Sr representing the calculated value into the read section 352. The storage section 353 stores the read-out gain setting value (a), the scale factor setting value (b), and the image processing condition setting value (c) suitable for the aforesaid maximum value, minimum value, signal value which occurs most frequently, or the like. The read section 352 reads the setting values (a), (b) and (c) suitable for the signal Sr from the storage section 353, and feeds them respectively into the amplifier 311, the A/D converter 312, and the signal processing circuit 313.

How the signal extracting section 350 extracts a signal will now be described below. The image signal range determining means 220 is composed of a differentiation processing section 221, a threshold value adjusting section 222, a prospective contour point signal detecting section 223, a signal extracting section 224, and a probability density function analyzing section 225. The preliminary read-out image signal Sp is fed into the differentiation processing section 221 and the signal extracting section 224. The differentiation processing section 221 differentiates the components of the preliminary read-out image signal Sp corresponding to positions on the stimulable phosphor sheet 103 located along a line D1, then along lines D2, D3, ..., Dn shown in FIG. 2 or FIG. 3. Differentiation processing may be of the one-dimensional type of first or higher order, or may be of the two-dimensional type of first or higher order. In cases of a discretely sampled image, differentiation is equivalent to calculation of the difference between the values of neighboring image signal components. In this embodiment, the difference in the values of neighboring image signal components is calculated. The lines D1 through Dn are set so that they cover all area of the stimulable phosphor sheet 103 and at least some of them extend across the image part corresponding to the radiation blocking material such as the image part J corresponding to the radiation blocking plate. In this embodiment, the lines D1 through Dn are parallel to one side of the stimulable phosphor sheet 103 and are spaced apart from one another. Alternatively, a plurality of lines may be set which radiate from the center point of the stimulable phosphor sheet 103.

Figure 4A:
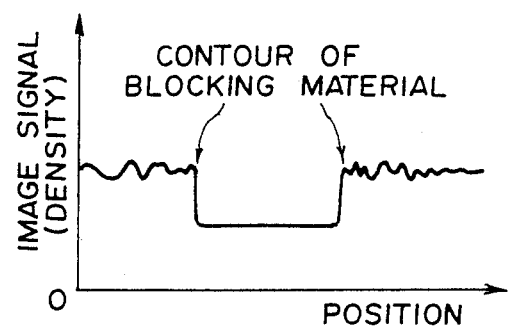
FIG. 4A is a graph showing the distribution of image signal components in the embodiment of the method for determining a desired image signal range in accordance with the present invention.
Figure 4B:
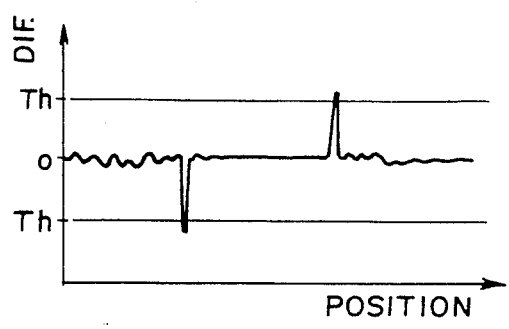
FIG. 4B is a graph showing the distribution of the values of the differences between neighboring image signal components in the embodiment of the method for determining a desired image signal range in accordance with the present invention.

Differentiation processing is carried out, and the differences among image signal components of the preliminary read-out image signal Sp corresponding to adjacent positions on the stimulable phosphor sheet 103 are calculated. A signal Sm representing the differences is fed into the prospective contour point signal detecting section 223. Based on the signal Sm representing the differences and a signal Sth which represents a threshold value Th and which is received from the threshold value adjusting section 222, the prospective contour point signal detecting section 223 detects prospective contour points which are considered to be present on a contour of the image part corresponding to the radiation blocking material. Specifically, the levels of the image signal components of the preliminary read-out image signal Sp for the image part corresponding to the radiation blocking material are distinctly higher than those for the other image part. Therefore, the values of the image signal components of the preliminary read-out image signal Sp corresponding to positions on the stimulable phosphor sheet 103 located along a line extending across the image part corresponding to the radiation blocking material are distributed as shown in FIG. 4A. Accordingly, as shown in FIG. 4B, the values of the differences of adjacent aforesaid image signal components change markedly at a contour of the image part corresponding to the radiation blocking material. The prospective contour point signal detecting section 223 detects a point, at which the absolute value of a difference exceeds the predetermined threshold value Th, as a prospective contour point.

Thereafter, the prospective contour point signal detecting section 223 finds the positions of picture elements, respectively corresponding to the prospective contour points detected in the manner described above, and feeds a signal Se representing the positions of the picture elements into the signal extracting section 224. Most of the prospective contour points detected in the manner described above are present on the contour of the image part corresponding to the radiation blocking material. However, because the image density changes sharply also at some positions in the object image part of a radiation image, several points which are not truly present on the contour of the image part corresponding to the radiation blocking material are detected as the prospective contour points.

Figure 6:
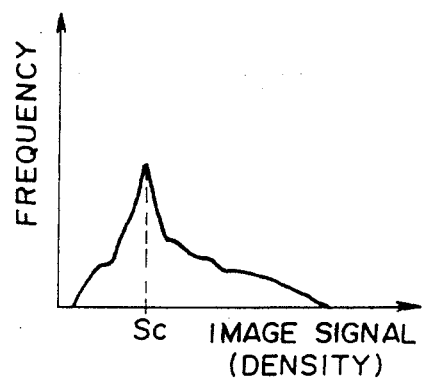
FIG. 6 is a graph showing the probability density function of extracted image signal components in the embodiment of the method for determining a desired image signal range in accordance with the present invention.

The signal extracting section 224 extracts only the image signal components representing the positions of the picture elements corresponding to prospective contour points, which are represented by the signal Se, from the preliminary read-out image signal Sp, and feeds a preliminary read-out image signal Sp" composed of the extracted image signal components into the probability density function analyzing section 225. The probability density function analyzing section 225 generates a probability density function of the preliminary read-out image signal Sp", and finds an image signal value which occurs most frequently, i.e. the image signal value corresponding to the maximum value of the probability density function. By way of example, the probability density function shown in FIG. 6 is obtained, in which an image signal value Sc corresponds to the maximum value of the probability density function. The probability density function analyzing section 225 feeds a signal St, which represents the image signal value Sc, into the signal extracting section 350 of the control circuit 314.

Figure 7:
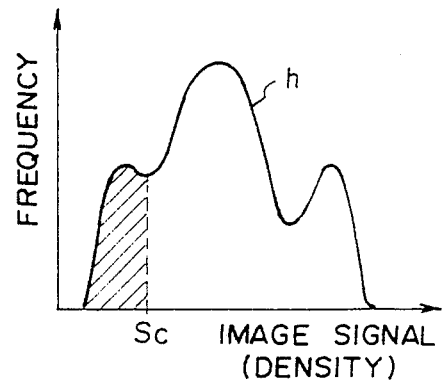
FIG. 7 is a graph showing the probability density function of desired image signal components in the embodiment of the method for determining a desired image signal range in accordance with the present invention.

The signal extracting section 350 extracts only the image signal components whose values are not smaller than the image signal value Sc from the preliminary read-out image signal Sp which is received from the A/D converter 211. The signal extracting section 350 feeds a preliminary read-out image signal Sp' composed of the extracted image signal components into the probability density function analyzing section 351. As described above, it is considered that the image signal value Sc corresponding to the maximum value of the probability density function represents the image information stored at the contour of the image part corresponding to the radiation blocking material which image part has a markedly low image density. Therefore, the preliminary read-out image signal Sp' extracted in the manner described above and fed into the probability density function analyzing section 351 substantially represents only the image part outside of the image part corresponding to the radiation blocking material. Specifically, the probability density function of the whole preliminary read-out image signal Sp is indicated by h in FIG. 7, whereas the probability density function of the extracted preliminary read-out image signal Sp' is represented by the region of curve h for the image signal values larger than the image signal value Sc in FIG. 7. (That is, the hatched region in FIG. 7 is removed from the probability density function of the whole preliminary read-out image signal Sp.) The aforesaid setting values (a), (b) and (c) are adjusted on the basis of the probability density function of the preliminary read-out image signal Sp'. Therefore, the setting values (a), (b) and (c) are not adversely affected by the image part corresponding to the radiation blocking material, which image part has a very low image density, are made suitable for the radiation image information about the object. When the read-out conditions for the final readout are adjusted on the basis of the setting values (a) and (b) determined in this manner and/or the image processing conditions are adjusted on the basis of the setting value (c) determined in this manner, it is possible to reproduce a visible radiation image suitable for viewing purposes, particularly for diagnostic purposes.

In the aforesaid embodiment, the image signal value Sc is used as the reference signal value during the signal extraction in the signal extracting section 350. Alternatively, a signal value on the image density side slightly lower than the image signal value Sc may be used as said reference signal value. Also, when the probability density function of the preliminary read-out image signal Sp" is generated, the frequencies of occurrence of the image signal components of the preliminary read-out image signal Sp" may be weighted with the absolute values of the corresponding differentiated values so that the image signal value representing the contour of the image part corresponding to the radiation blocking material corresponds more reliably to the maximum value of the probability density function.

In general, the preliminary readout described above is carried out for picture elements which are larger than those of the final readout. Differentiation processing may be carried out on image signal components obtained by such a comparatively rough read-out operation. Alternatively, the image signal components may be interpolated to obtain image signal components representing picture elements of a finer resolution, and differentiation processing may be carried out for this larger number of image signal components. Also, differentiation processing may be conducted for image signal components obtained from averaging of image signal components detected at a plurality of picture elements.

Also, in the aforesaid embodiment, a desired image signal range is determined on the basis of the preliminary read-out image signal Sp. It is also possible to determine a desired image signal range in the same manner as that described above on the basis of the final read-out image signal So. In this case, the desired image signal range is utilized, for example, to adjust the image processing condition setting value (c).

The aforesaid embodiment is utilized to ascertain the image input information about the object accurately and to adjust the read-out conditions for the final readout and/or the image processing conditions on the basis of the image input information. The method for determining a desired image signal range in accordance with the present invention is also applicable to other purposes.

In the aforesaid embodiment, a stimulable phosphor sheet is used as the recording medium for recording a radiation image. However, the method for determining a desired image signal range in accordance with the present invention is also applicable to cases where a radiation image is read out from a recording medium such as silver halide photographic film on which an X-ray image has been recorded.

Figure 9:
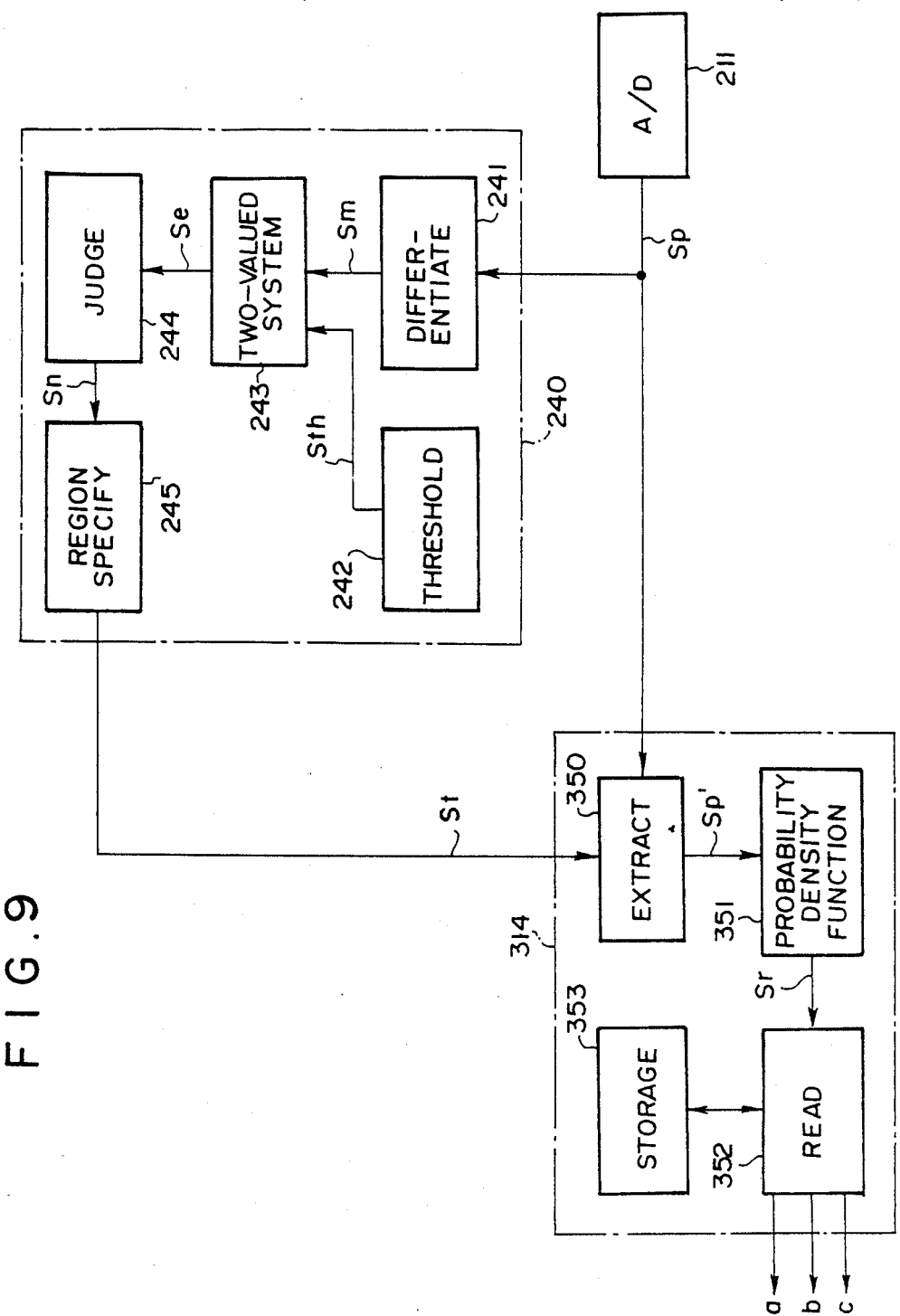
FIG. 9 is a block diagram showing an image region determining means of a radiation image recording and reproducing system wherein a first embodiment of the method for determining a desired image region in accordance with the present invention is employed.

A first embodiment of the method for determining a desired image region in accordance with the present invention will be described hereinbelow with reference to FIG. 9. FIG. 9 shows an image region determining means 240 which is used in the radiation image recording and reproducing system shown in FIG. 1 in lieu of the image signal range determining means 220 shown in FIG. 5.

The image region determining means 240 is composed of a differentiation processing section 241, a threshold value adjusting section 242, a two-valued system generating section 243, a judging section, and a region specifying section 245. The preliminary read-out image signal Sp is fed into the differentiation processing section 241. The differentiation processing section 241 differentiates the components of the preliminary read-out image signal Sp corresponding to positions on the stimulable phosphor sheet 103 located along a line D1, then along lines D2, D3, . . . , Dn shown in FIG. 2 or FIG. 3. Differentiation processing may be of the one-dimensional type of first or higher order, or may be of the two-dimensional type of first or higher order. In cases of a discretely sampled image, differentiation is equivalent to calculation of the difference between the values of neighboring image signal components. In this embodiment, the difference in the values of neighboring image signal components is calculated. The lines D1 through Dn are set so that they cover all area of the stimulable phosphor sheet 103 and at least some of them extend across the image part corresponding to the radiation blocking material such as the image part J corresponding to the radiation blocking plate. In this embodiment, the lines D1 through Dn are parallel to one side of the stimulable phosphor sheet 103 and are spaced apart from one another. Alternatively, a plurality of lines may be set which radiate from the center point of the stimulable phosphor sheet 103.

Figure 8A:
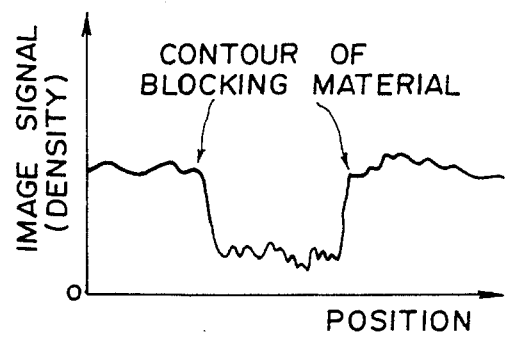
FIG. 8A is a graph showing the distribution of image signal components in embodiments of the method for determining a desired image region in accordance with the present invention.
Figure 8B:
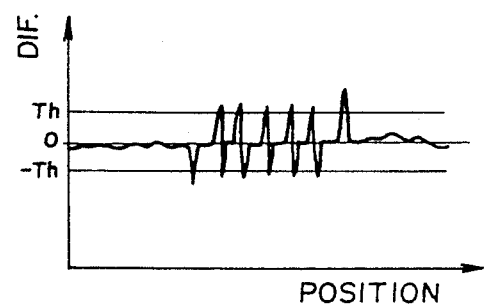
FIG. 8B is a graph showing the distribution of the values of the differences between neighboring image signal components in the embodiments of the method for determining a desired image region in accordance with the present invention.

Differentiation processing is carried out, and the differences among image signal components of the preliminary read-out image signal Sp corresponding to adjacent positions on the stimulable phosphor sheet 103 are calculated. A signal Sm representing the differences is fed into the two-valued system generating section 243. Based on the signal Sm representing the differences and a signal Sth which represents a threshold value Th and which is received from the threshold value adjusting section 242, the two-valued system generating section 243 detects points on the stimulable phosphor sheet 103 where energy from scattered radiation is considered to be stored. Specifically, a small number of X-ray quanta arrived at the part of the stimulable phosphor sheet 103 corresponding to the radiation blocking material when a radiation image was stored on the stimulable phosphor sheet 103. Therefore, the image signal components representing the image part corresponding to the radiation blocking material includes many noise components. As a result, the values of the image signal components of the preliminary read-out image signal Sp corresponding to positions on the stimulable phosphor sheet 103 located along a line extending across the image part corresponding to the radiation blocking material are distributed as shown in FIG. 8A. Accordingly, as shown in FIG. 8B, the values of the differences of adjacent aforesaid image signal components change markedly at the part where noise is present. The two-valued system generating section 243 detects points at which the absolute values of differences exceed the predetermined threshold value Th, and allocates a logical value "1" to these points. The two-valued system generating section 243 allocates a logical value "0" to points at which the absolute values of differences at not larger than the predetermined threshold value Th. Thereafter, the two-valued system generating section 243 feeds a signal Se representing the two-valued system to the judging section 244.

As described above, the logical value "1" is allocated to the points corresponding to the part where energy from scattered radiation is stored. The logical value "1" is also allocated to points corresponding to the object image part where the image density changes sharply. However, in the image part corresponding to the radiation blocking material, energy from scattered radiation is stored densely at a level markedly higher than the level of energy stored in the surrounding part. Therefore, the points allocated with the logical value "1" are present densely in the image part corresponding to the radiation blocking material.

Figure 10:
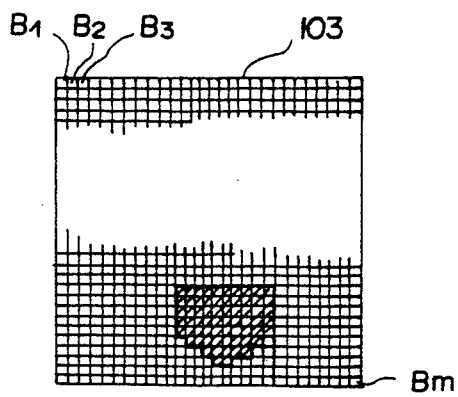
FIG. 10 is a schematic view showing the blocks of a stimulable phosphor sheet in the first embodiment of the method for determining a desired image region in accordance with the present invention is employed.

Upon receiving the signal Se representing the two-valued system, the judging section 244 classifies the signal Se into groups of information corresponding to blocks B1, B2, B3, ..., Bm of the stimulable phosphor sheet 103 as shown in FIG. 10. The judging section 244 counts how many logical values "1" are included in each group. The judging section 244 finds blocks associated with the number of the logical values "1" which is not larger than a predetermined value u, and feeds a signal Sn representing these blocks to the region specifying section 245. As described above, the points allocated with the logical value "1" are present densely in the image part corresponding to the radiation blocking material. Therefore, blocks associated with the number of the logical values "1" which is not larger than a predetermined value u can be regarded as being present in the region outside of the image part corresponding to the radiation blocking material. Specifically, in cases where processing is carried out in the manner described above for the stimulable phosphor sheet 103 on which the image part J corresponding to the radiation blocking plate is stored as shown in FIG. 3, blocks associated with the number of the logical values "1" larger than a predetermined value u are present in the hatched region in FIG. 10. The other blocks are associated with the number of the logical values "1" which is not larger than a predetermined value $\alpha$.

In this embodiment, the sizes of the blocks B1 through Bm are equal to one another, and therefore the number of the logical values "1" occurring for each block is counted in order to find the degree with which the logical value "1" occurs for each block. In cases where the sizes of the blocks B1 through Bm are different from one another, the degree of occurrence of the logical value "1" (for example, the ratio of the number of the picture elements, which correspond to a block and which are allocated with the logical value "1", to the total number of the picture elements corresponding to the block) is found, and a signal Sn representing the blocks associated with the degree of occurrence of the logical value "1" which degree is not larger than a predetermined degree is fed into the region specifying section 245.

The region specifying section 245 finds a region composed of the blocks represented by the signal Sn (i.e. the region outside of the hatched part in FIG. 10), and feeds a signal St representing said region into the signal extracting section 350 of the control circuit 314.

The signal extracting section 350 extracts only the image signal components corresponding to the region represented by the signal St from the preliminary read-out image signal Sp which is received from the A/D converter 211. The signal extracting section 350 feeds a preliminary read-out image signal Sp' composed of the extracted image signal components into the probability density function analyzing section 351. The region represented by the signal St is the part of the whole region of the stimulable phosphor sheet 103, which part is present substantially on the outward side of the image part corresponding to the radiation blocking material. Therefore, the preliminary read-out image signal Sp' extracted in the manner described above and fed into the probability density function analyzing section 351 substantially represents only the image part outside of the image part corresponding to the radiation blocking material. The aforesaid setting values (a), (b) and (c) are adjusted on the basis of the probability density function of the preliminary read-out image signal Sp'. Therefore, the setting values (a), (b) and (c) are not adversely affected by the image part corresponding to the radiation blocking material, which image part has a very low image density, are made suitable for the radiation image information about the object. When the read-out conditions for the final readout are adjusted on the basis of the setting values (a) and (b) determined in this manner and/or the image processing conditions are adjusted on the basis of the setting value (c) determined in this manner, it is possible to reproduce a visible radiation image suitable for viewing purposes, particularly for diagnostic purposes.

In this embodiment, in order to convert the image information into the two-valued system, an investigation is made as to whether or not the absolute values of the differentiated values exceed the threshold value. The processing for converting the image information into the two-valued system need not necessarily be carried out, and the degree with which the points associated with the absolute values of the differentiated values exceeding the threshold value occur may be detected.

Figure 11:
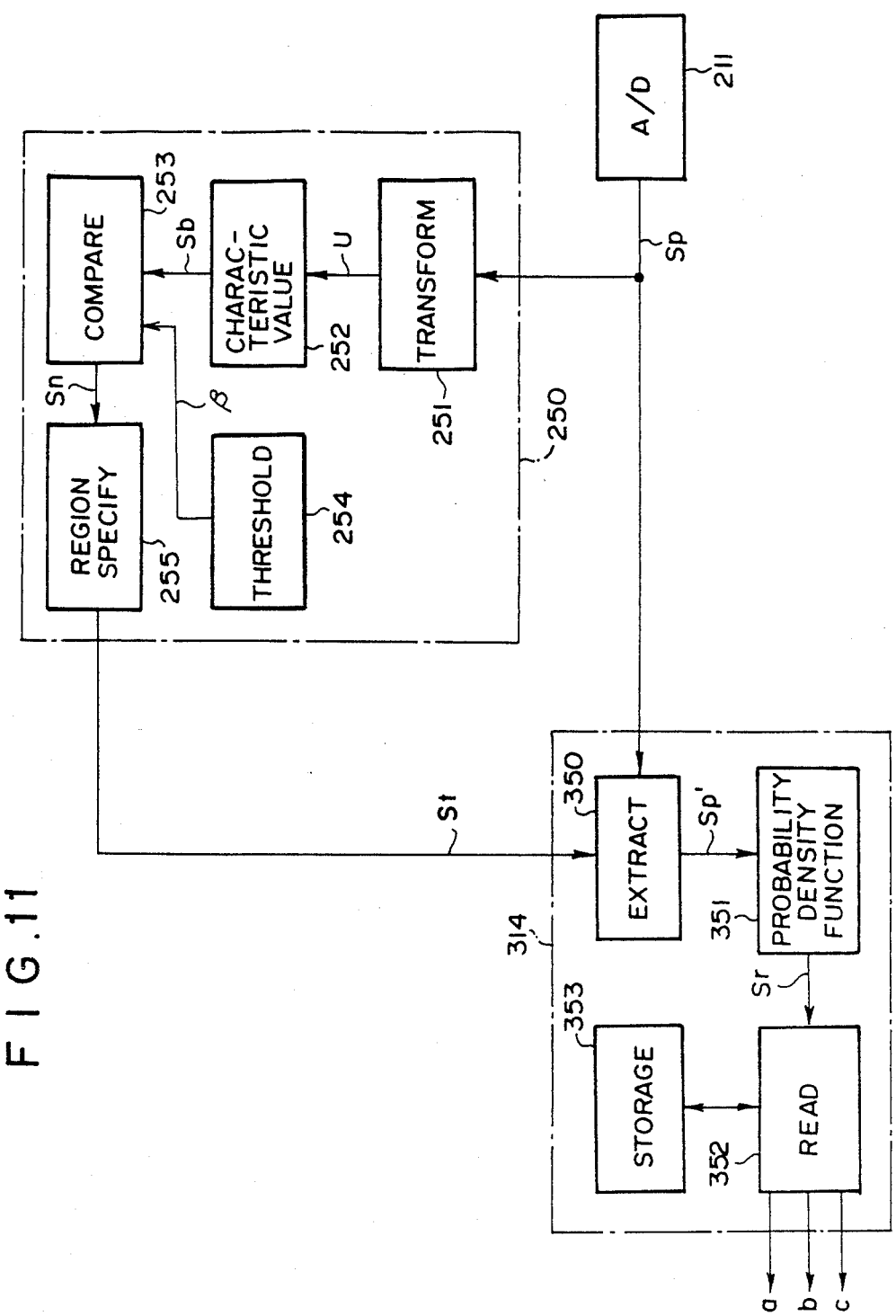
FIG. 11 is a block diagram showing an image region determining means of a radiation image recording and reproducing system wherein a second embodiment of the method for determining a desired image region in accordance with the present invention is employed.

A second embodiment of the method for determining a desired image region in accordance with the present invention will be described hereinbelow with reference to FIG. 11. FIG. 11 shows an image region determining means 250 which is used in the radiation image recording and reproducing system shown in FIG. 1 in lieu of the image region determining means 240 shown in FIG. 9.

Figure 12:
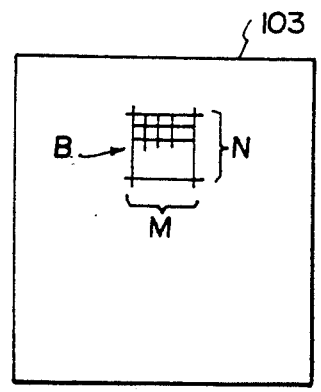
FIG. 12 is an explanatory view showing how a stimulable phosphor sheet is divided into small blocks in order to carry out orthogonal transformation in the second embodiment of the method for determining a desired image region in accordance with the present invention is employed.

The preliminary read-out image signal Sp is fed into an orthogonal transformation section 251 of the image region determining means 250, which carries out two-dimensional orthogonal transformation of the preliminary read-out image signal Sp. For example, as shown in FIG. 12, the two-dimensional orthogonal transformation is conducted on the image signal components corresponding to each of rectangular blocks B, B, ... each of which comprises MxN number of samples (picture elements). As the orthogonal transformation, Fourier transformation, cosine transformation, Hadamard transformation, or the like is used. Since the transformation matrix in Hadamard transformation is constituted just by +1 and −1, Hadamard transformation can be executed by use of a transformation circuit simpler than in the other types of orthogonal transformation. Also, as is well known, two-dimensional orthogonal transformation can be reduced to one-dimensional orthogonal transformation. Specifically, in order to carry out the two-dimensional orthogonal transformation, the image signal components at the MxN number of picture elements in a two-dimensional block B is subjected to one-dimensional orthogonal transformation along the longitudinal direction, and then the MxN number of transformed signals thus obtained are subjected to one-dimensional orthogonal transformation along the transverse direction. The transformation along the longitudinal direction and the transformation along the transverse direction may be conducted in the reverse order.

Figure 13:
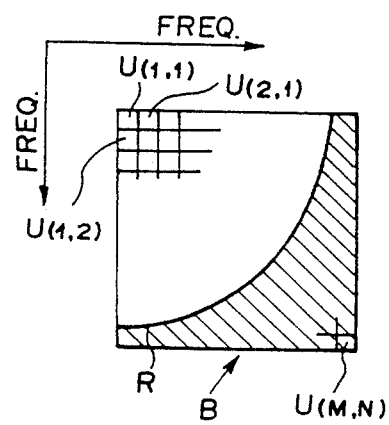
FIG. 13 is an explanatory view showing how transformed signal components obtained from orthogonal transformation are arrayed.

As shown in FIG. 13, transformed signal components U obtained from the two-dimensional orthogonal transformation are put side by side in each block B in the longitudinal and transverse directions in the order of the sequency of the function on which the orthogonal transformation is based (for example, the Walsh function in the case of Hadamard transformation, or the trigonometrical function in the case of Fourier transformation). Since the sequency corresponds to the spatial frequency, the transformed signal components U are arranged in the order of the spatial frequency, i.e. in the order of the density of the detail components of the image, in the longitudinal and transverse directions in the block B. In FIG. 13, a transformed signal component $U(1,1)$ at the left end column on the top row corresponds to sequency 0 (zero). As is well known, the transformed signal $U(1,1)$ represents the average image density in the block B.

The transformed signal components U arranged in the order of the sequency of the function on which the two-dimensional orthogonal transformation is based are sent to a characteristic value calculating section 252 shown in FIG. 11. The characteristic value calculating section 252 adds the absolute values of the transformed signal components among the transformed signal components U for each block B, which transformed signal components are on the frequency side higher than the sequency which corresponds to a specific, markedly high spatial frequency, i.e. on the side lower than the arc R in FIG. 13. The sum is larger as more components of a markedly high frequency are included in the image information corresponding to the block B. Therefore, the sum represents the proportion with which super-high frequency components are present in the image information corresponding to the region inside of each block.

A signal Sb representing the sums calculated for the respective blocks B, B, ... is fed into a comparing section 253. The comparing section 253 compares the sums represented by the signal Sb with a threshold value $\beta$ which is set by a threshold value adjusting section 254.

The comparing section 253 finds the blocks associated with the sums smaller than the threshold value $\beta$, i.e. the blocks associated with the proportions smaller than a predetermined value (which corresponds to the threshold value $\beta$), and feeds a signal Sn representing these blocks into a region specifying section 255.

The region specifying section 255 finds a region composed of the blocks represented by the signal Sn, and feeds a signal St representing said region into the signal extracting section 350 of the control circuit 314.

The signal extracting section 350 extracts only the image signal components corresponding to the region represented by the signal St from the preliminary read-out image signal Sp which is received from the A/D converter 211. The signal extracting section 350 feeds a preliminary read-out image signal Sp' composed of the extracted image signal components into the probability density function analyzing section 351.

As described above, the image signal components representing the image part corresponding to the radiation blocking material include many noise components. Therefore, the sums calculated for the respective blocks B, B, ... located in the image part corresponding to the radiation blocking material are distinctly larger than those for the blocks B, B, ... located in the image part outside of the image part corresponding to the radiation blocking material. Therefore, the region composed of the blocks associated with the sums smaller than the threshold value $\beta$ can be regarded as being the region outside of the image part corresponding to the radiation blocking material. Accordingly, the preliminary read-out image signal Sp' extracted in the manner described above substantially represents only the image part outside of the image part corresponding to the radiation blocking material. With this embodiment, the same effects as with the aforesaid first embodiment are obtained.

In this embodiment, the sum of the absolute values of the transformed signal components is used as the characteristic value representing the proportion with which super-high frequency components are present in the image information corresponding to the region inside of each block B. As the characteristic value, it is also possible to use the sum of squares of the values of the transformed signal components, or the like. Alternatively, the absolute values of the transformed signal components U, the squares of the values of the transformed signal components U, or the like may be cumulated starting with the transformed signal component associated with the sequency corresponding to the maximum frequency and continuing with transformed signal components associated with the sequency corresponding to the low frequency side. The sequency associated with the value resulting from the cumulation, which value reaches a predetermined value, may be used as the aforesaid characteristic value. This is because the value resulting from the cumulation reaches a predetermined value at a sequency corresponding to a higher frequency as the proportion with which super-high frequency components are present in the image information corresponding to the region inside of each block B is higher.

Figure 14:
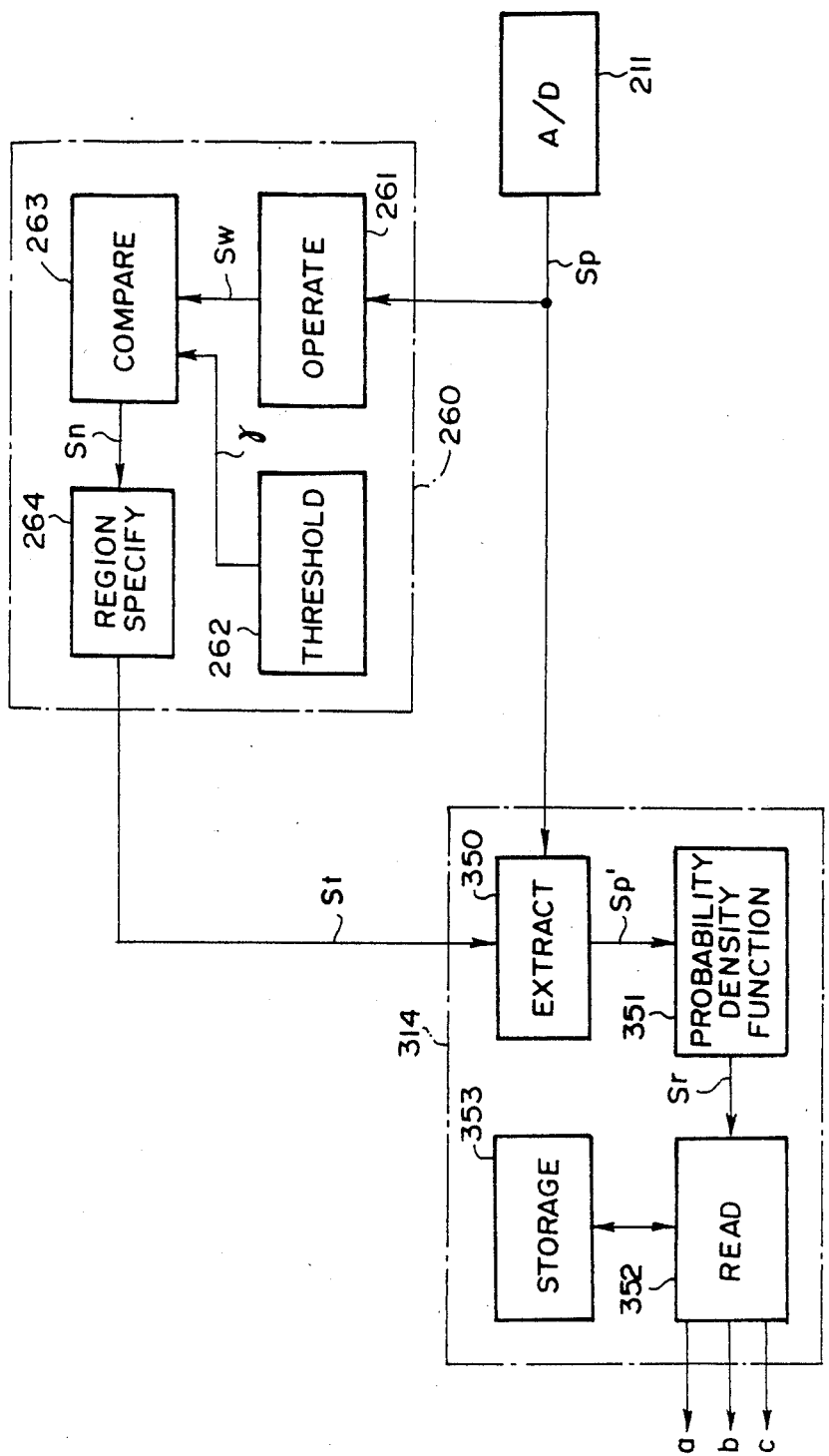
FIG. 14 is a block diagram showing an image region determining means of a radiation image recording and reproducing system wherein a third embodiment of the method for determining a desired image region in accordance with the present invention is employed.

A third embodiment of the method for determining a desired image region in accordance with the present invention will be described hereinbelow with reference to FIG. 14. FIG. 14 shows an image region determining means 260 which is used in the radiation image recording and reproducing system shown in FIG. 1 in lieu of the image region determining means 240 shown in FIG. 9.

The preliminary read-out image signal Sp is fed into an operating section 261 of the image region determining means 260. The operating section 261 sets a logical space determined by an x-y-z coordinate system as shown in FIG. 15, and sets the x-y plane corresponding to the stimulable phosphor sheet 103. The operating section 261 plots points G1, G2, G3, ... so that they are spaced apart along the z axis from the x-y plane by distances which correspond to values of the image signal components of the preliminary read-out image signal Sp. Specifically, coordinate points Q1, Q2, Q3, ... which correspond to positions of picture elements located on the stimulable phosphor sheet 103 are set in the x-y plane. The points G1, G2, G3, ... are set so that the values of the image signal components of the preliminary read-out image signal Sp at the positions of the picture elements corresponding to the respective coordinate points Q are expressed as the distances between the points G and Q. Thereafter, the operating section 261 extracts small divisions B', B', ... in the x-y plane (only a single hatched small division B' is shown in FIG. 15), which small divisions correspond to small blocks B, B, ... of the stimulable phosphor sheet 103. For each small division B', a plane W is formed in which all of the points G1, G2, G3, ... spaced from the coordinate points Q1, Q2, Q3, ... in the small division B' lie. The operating section 261 calculates the surface areas of the planes W, W, ... thus formed for the respective small divisions B', B', ... (i.e. for the respective blocks B, B, ... ), and feeds a signal Sw representing the surface areas into a comparing section 263.

The comparing section 263 compares the surfaces areas represented by the signal Sw with a threshold value $\gamma$ which is set by a threshold value adjusting section 262. The comparing section 263 finds the blocks B, B, ... corresponding to the small divisions B', B', ... associated with the surface areas smaller than the threshold value $\gamma$, and feeds a signal Sn representing these blocks B, B, ... into a region specifying section 264.

The region specifying section 264 finds a region composed of the blocks represented by the signal Sn, and feeds a signal St representing said region into the signal extracting section 350 of the control circuit 314.

The signal extracting section 350 extracts only the image signal components corresponding to the region represented by the signal St from the preliminary read-out image signal Sp which is received from the A/D converter 211. The signal extracting section 350 feeds a preliminary read-out image signal Sp' composed of the extracted image signal components into the probability density function analyzing section 351.

As described above, the image signal components representing the image part corresponding to the radiation blocking material include many noise components. Therefore, for small divisions B', B', ... corresponding to the blocks B, B, ... located in the image part corresponding to the radiation blocking material, the aforesaid surface areas are comparatively large. This is because the distances of the points G from the coordinate points Q are very random. On the other hand, for small divisions B', B', ... corresponding to the blocks B, B, ... located in the image part outside of the image part corresponding to the radiation blocking material, the aforesaid surface areas are comparatively small because the distances of the points G from the coordinate points Q are not very random. Therefore, the region composed of the blocks B, B, ... corresponding to the small divisions B', B', ... associated with the surface areas smaller than the threshold value $\gamma$ can be regarded as being the region outside of the image part corresponding to the radiation blocking material. Accordingly, the preliminary read-out image signal Sp' extracted in the manner described above substantially represents only the image part outside of the image part corresponding to the radiation blocking material. With this embodiment, the same effects as with the aforesaid first embodiment are obtained.

In this embodiment, the sizes of the blocks B, B, ... , i.e. the sizes of the small divisions B', B', ... are equal to one another. Therefore, the surface area of the plane W for each small division B' is calculated in order to detect the ratio of the surface area of the plane W to the area of the small division B'. In cases where the sizes of the blocks B, B, ... , are different from one another, the ratios of the surface areas of the planes W, W, ... to the areas of the small divisions B', B', ... is calculated, and a signal Sn representing the blocks B, B, ... corresponding to the small divisions B', B', ... associated with the ratios smaller than a predetermined value is fed into the region specifying section 264.

In general, the preliminary readout described above is carried out for picture elements which are larger than those of the final readout. Differentiation processing in the first embodiment of the method for determining a desired image region in accordance with the present invention, orthogonal transformation processing in the second embodiment of the method for determining a desired image region in accordance with the present invention, and processing for calculating the surface area of the planes W, W, .... in the third embodiment of the method for determining a desired image region in accordance with the present invention may be carried out on image signal components obtained by such a comparatively rough read-out operation. Alternatively, the image signal components may be interpolated to obtain image signal components representing picture elements of a finer resolution, and the aforesaid types of processing may be carried out for this larger number of image signal components. Also, the aforesaid types of processing may be conducted for image signal components obtained from averaging of image signal components detected at a plurality of picture elements.

Also, in the aforesaid embodiments of the method for determining a desired image region in accordance with the present invention, a desired image region is determined on the basis of the preliminary read-out image signal Sp. It is also possible to determine a desired image region in the same manner as that described above on the basis of the final read-out image signal So. In this case, the desired image region is utilized, for example, to adjust the image processing condition setting value (c).

The aforesaid embodiments of the method for determining a desired image region in accordance with the present invention is utilized to ascertain the image input information about the object accurately and to adjust the read-out conditions for the final readout and/or the image processing conditions on the basis of the image input information. The method for determining a desired image region in accordance with the present invention is also applicable to other purposes.

In the aforesaid embodiments of the method for determining a desired image region in accordance with the present invention, a stimulable phosphor sheet is used as the recording medium for recording a radiation image. However, the method for determining a desired image region in accordance with the present invention is also applicable to cases where a radiation image is read out from a recording medium such as silver halide photographic film on which an X-ray image has been recorded.

I claim:

1. A method for determining a desired image region on a recording medium having a radiation image of an object recorded thereon together with an image of a radiation blocking material, which image region substantially carries only a desired image part outside of the image part corresponding to the radiation blocking material, the method for determining a desired image region comprising the steps of:
(i) carrying out an image read-out operation from said recording medium in order to obtain an image signal,
(ii) carrying out differentiation processing on image signal components of said image signal corresponding to positions located along each of a plurality of lines on said recording medium, which lines include lines extending across the image part corresponding to said radiation blocking material,
(iii) finding the absolute values among the values resulting from the carrying out of differentiation processing on said image signal components, which absolute values exceed a predetermined threshold value,
(iv) dividing the area of said recording medium into a plurality of small blocks, and finding the degree of occurrence with which the points on said recording medium associated with the absolute values exceeding said threshold value occur in each of said small blocks, and
(v) determining a group of the small blocks, in which the degrees of occurrence of said points are not higher than a predetermined degree, as said desired image region.

2. A method for determining a desired image region as defined in claim 1 wherein processing for calculating the differences between neighboring image signal components is carried out as said differentiation processing.

3. A method for determining a desired image region as defined in claim 1 wherein a plurality of said lines are parallel to one another.

4. A method for determining a desired image region as defined in claim 1 wherein a plurality of said lines radiate from a single point on said recording medium.

5. A method for determining a desired image region as defined in claim 1 wherein the sizes of said small blocks are equal to one another, and the number of said points which occur is found as the degree of occurrence with which said points occur.

6. A method for determining a desired image region as defined in any of claims 1 through 5 wherein said recording medium is a stimulable phosphor sheet, and said image signal is detected during an image read-out operation wherein said stimulable phosphor sheet is scanned with stimulating rays which causes it to emit light in proportion to the amount of energy stored thereon during exposure to radiation, and the emitted light is detected photoelectrically.

7. A method for determining a desired image region on a recording medium having a radiation image of an object recorded thereon together with an image of a radiation blocking material, which image region substantially carries only a desired image part outside of the image part corresponding to the radiation blocking material, the method for determining a desired image region comprising the steps of:
(i) carrying out an image read-out operation from said recording medium in order to obtain an image signal,
(ii) dividing the area of said recording medium into a plurality of small blocks, and carrying out orthogonal transformation of image signal components of said image signal corresponding to each of said small blocks in order to obtain transformed signal components,
(iii) finding a characteristic value, which represents the proportion with which super-high frequency components are present in the image information corresponding to the region inside of each said small block, from the transformed signal components, and
(iv) determining a group of the small blocks associated with the proportions, which are represented by the characteristic values and which are smaller than a predetermined value, as said desired image region.

8. A method for determining a desired image region as defined in claim 7 wherein said characteristic value is the sum of the absolute values of the transformed signal components among those for each said small block, which transformed signal components are on the higher frequency side than a sequency which corresponds to a specific spatial frequency.

9. A method for determining a desired image region as defined in claim 7 wherein said characteristic value is the sum of squares of the values of the transformed signal components among those for each said small block, which transformed signal components are on the higher frequency side than a sequency which corresponds to a specific spatial frequency.

10. A method for determining a desired image region as defined in claim 7 wherein the absolute values of the transformed signal components for each said small block or the squares of the values of the transformed signal components for each said small block are cumulated starting with the transformed signal component associated with the sequency corresponding to the maximum frequency and continuing with transformed signal components associated with the sequency corresponding to the low frequency side, and the sequency associated with the value resulting from the cumulation, which value reaches a predetermined value, is used as said characteristic value.

11. A method for determining a desired image region as defined in any of claims 7 through 10 wherein said recording medium is a stimulable phosphor sheet, and said image signal is detected during an image read-out operation wherein said stimulable phosphor sheet is scanned with stimulating rays which causes it to emit light in proportion to the amount of energy stored thereon during exposure to radiation, and the emitted light is detected photoelectrically.

12. A method for determining a desired image region on a recording medium having a radiation image of an object recorded thereon together with an image of a radiation blocking material, which image region substantially carries only a desired image part outside of the image part corresponding to the radiation blocking material, the method for determining a desired image region comprising the steps of:

(i) carrying out an image read-out operation from said recording medium in order to obtain an image signal, (ii) setting a logical space having a plane corresponding to said recording medium, and setting coordinate points, which correspond to positions of picture elements located on said recording medium, in said plane, (iii) expressing the values of said image signal at the positions of the picture elements corresponding to the respective coordinate points as the distances between points, which are spaced apart in a predetermined direction from the respective coordinate points, and the corresponding coordinate points, (iv) dividing said plane into small divisions corresponding to small blocks of said recording medium, and calculating the surface area of a plane in which all of said points spaced from the respective coordinate points in each said small division lie, and (v) calculating the ratio of said surface area to the area of each said small division, and determining a group of the small blocks of said recording medium corresponding to the small divisions associated with the ratios which are smaller than a predetermined value, as said desired image region.

13. A method for determining a desired image region as defined in claim 12 wherein the sizes of said small divisions are equal to one another, and said surface area is calculated as said ratio.

14. A method for determining a desired image region as defined in claim 12 or 13 wherein said recording medium is a stimulable phosphor sheet, and said image signal is detected during an image read-out operation wherein said stimulable phosphor sheet is scanned with stimulating rays which causes it to emit light in proportion to the amount of energy stored thereon during exposure to radiation, and the emitted light is detected photoelectrically.

* * * * *